United States Patent [19]

Gratzke

[11] 3,729,655

[45] Apr. 24, 1973

[54] PROTECTIVE CIRCUIT ARRANGEMENT FOR A SWITCHING TRANSISTOR IN AN INDUCTIVE LOAD CIRCUIT

[75] Inventor: Werner Gratzke, Erlangen, Germany

[73] Assignee: Siemens Aktiengesellschaft, Munich, Germany

[22] Filed: Aug. 10, 1972

[21] Appl. No.: 279,392

[30] Foreign Application Priority Data

May 12, 1972 Germany.....................P 22 23 376.7

[52] U.S. Cl. ......317/33 R, 317/148.5 R, 317/DIG. 6, 321/14
[51] Int. Cl. ..............................................H02h 7/14
[58] Field of Search ......................317/DIG. 6, 11 E, 317/33 R, DIG. 4, 148.5 R; 321/11, 14

[56] References Cited

UNITED STATES PATENTS

| | | | |
|---|---|---|---|
| 3,205,412 | 9/1965 | Winston | 317/DIG. 4 |
| 3,287,608 | 11/1966 | Pokrant | 317/DIG. 6 |
| 3,390,306 | 6/1968 | White | 317/33 R |

*Primary Examiner*—James D. Trammell
*Attorney*—Hugh A. Chapin

[57] ABSTRACT

A protective circuit arrangement for a switching transistor in an inductive load circuit has a series circuit consisting of a resistor and a controlled auxiliary valve shunted across the collector-emitter path of the switching transistor to take over the load current of the switching transistor when it is switched off. The control electrode of the auxiliary valve is controlled by a control device which consists of a capacitor and a charging resistor in series. A Zener diode may be shunted across the control device. The protective circuit arrangement may be used particularly in an inverter which has a plurality of switching transistors.

14 Claims, 4 Drawing Figures

3,729,655

PROTECTIVE CIRCUIT ARRANGEMENT FOR A SWITCHING TRANSISTOR IN AN INDUCTIVE LOAD CIRCUIT

BACKGROUND OF THE INVENTION

1. Field of the Invention

This invention relates to the field of transistorized electrical circuitry and, more particularly, to a protective circuit arrangement for a switching transistor which is arranged in an inductive load circuit for switching the load current on and off.

2. Description of the Prior Art

It is customary in engineering practice to use one or several parallel or series-connected switching transistors for switching on and off the load current in an inductive load circuit. It is, for instance, known to connect an inductive load of any desired kind to a DC source through the switching transistor of a DC switch and to adjust the mean value of the pulsating DC current through the choice of the on and off duration. It is also known in this art to construct inverters with switching transistors and to connect them to an inductive load, such as a rotating-field machine. Inverters with bridge circuits may contain four, six or more switching transistors.

A switching transistor, which is arranged in a load circuit containing inductances, is subjected to particular stresses if it is switched on and off by application or removal, respectively, of its base current. Particularly in switching off, overvoltages can occur which lead to its destruction, as the magnetic energy stored in the inductances of the load circuit to be switched off leads to a high energy density in its barrier layer during the switching-off process. If the inductances are particularly large, and/or if the switching-off process proceeds especially fast, the maximum permissible energy density may be exceeded, which leads to a so-called "second breakdown." For special switching transistors of high power rating, a maximum amount of energy $E_{sb}$ is therefore stated which this switching transistor is still capable of switching off. This maximum amount of energy $E_{sb}$ is given by $E_{sb} = 0.5\ L_{Tm}\ I_{Tm}^2$, where $L_{Tm}$ is the maximum permissible value of the inductance $L$ and $I_{Tm}$ the maximum permissible value of the load current $I_T$.

In order to keep the energy density occurring upon switching off in the barrier layer below the maximum value permissible for the switching transistor, switching transistors are used which are designed with respect to their rating for the switching-off process and are therefore overdesigned for nominal operation with the load current on. As compared to the application in which a purely resistive load is present in the load circuit, a considerably reduced utilization results for the case of a load circuit which includes inductances.

It has also been found that if the maximum permissible energy $E_{sb}$ is to be switched off in a switching transistor in an inductive load circuit, a relatively long switching-off time must be allowed in order to avoid dangerous overvoltages. This means that the reverse voltage must rise only slowly during the switching-off process. This is particularly detrimental in switching transistors for inverters. If the reverse voltage rises slowly, the load current commutates correspondingly slowly to the next switching transistor. Long commutation times, however, are not favorable for inverter operation at higher frequencies.

The measures known in the art to eliminate the excessive stress of switching transistors, particularly in an inverter with connected inductive load, have produced only limited success. The protective measures known to those skilled in this art and the problems with such measures include the following:

1. Although a Zener diode shunted across the collector-emitter path of the switching transistor protects against over-voltage during switching, it nevertheless brings the switching transistor into the critical region of second breakdown. Also, because of its low dissipation, the use of a Zener diode is confined to low power load circuits.

2. Although capacitor-resistor combinations connected across the collector-emitter path of the switching transistor permit a switching-off process in which second breakdown does not occur, this combination prolongs the switching-off time considerably. The appearance of large displacement currents mitigates against operation at higher switching-off frequencies or inverter operation with higher output frequencies, respectively.

3. Overvoltage arresters cannot be used at the low voltages usually found in load circuits with switching transistors because of their characteristics.

4. A varistor arranged in shunt to the collector-emitter path of the switching transistor would lead to high continuous losses. However, the switching transistor is to be highly utilized voltage-wise.

SUMMARY OF THE INVENTION

It is an object of this invention to describe a protective circuit arrangement for a switching transistor which is arranged for switching on and off the load current in an inductive load circuit. The protective circuit arrangement limits the overvoltage occurring in switching off the load current to a permissible magnitude, prevents second breakdown and keeps the switching-off losses of the switching transistor low. The protective circuit arrangement is designed so that it can also be used with switching transistors in an inverter, so that the inverter can be operated at output frequencies higher than has been customary up to now.

According to this invention, the foregoing problem in the prior art is solved by a protective circuit arrangement in which a series circuit consisting of a resistor and a controlled auxiliary valve in the manner of a transistor is connected parallel to the collector-emitter path of the switching transistor and the control electrode of the auxiliary valve is controlled by a control device as a function of the voltage rise at the switching transistor.

This protective circuit arrangement can be used with a PNP as well as with an NPN switching transistor. The resistor connected in series with the auxiliary valve can be either an ohmic resistance or a voltage-dependent resistance and a PNP or an NPN transistor can be used as the controlled auxiliary valve. The resistor absorbs the energy released in the switching-off process and converts it into heat. Overall, the protective circuit arrangement acts like a voltage-dependent resistance which is connected parallel to the collector-emitter path of the switching resistor.

In another embodiment of the protective circuit arrangement, the control device consists of a series circuit of a capacitor with a charging resistor, which is connected between the control electrode of the auxiliary valve and the collector of the switching transistor. The charging resistor can be embodied, in some cases, by the leads of the capacitor alone. This embodiment can be further developed so that the series circuit consisting of the capacitor and the charging resistor is shunted by a Zener diode, the Zener voltage of which is chosen so that the auxiliary valve is in full conduction if this voltage value is applied to its control electrode.

The protective circuit arrangement of this invention can be used advantageously with all switching transistors which are arranged in an inductive load circuit, such as in a DC selector switch. However, its advantages come to the fore particularly if it is used with switching transistors of an inverter which is designed with switching transistors and is connected to a DC source. In principle, one can use a separate protective circuit which is shunted across each switching transistor of the inverter. However, it is less expensive and therefore advisable to provide a single protective circuit for an entire group of switching transistors. In that case the arrangement can be made so that the protective circuit is connected through a diode poled in the conduction direction of the auxiliary valve to all those switching transistors of the inverter which are connected to the positive input terminal of the latter. Correspondingly, an arrangement can also be provided in which the protective circuit is connected through a diode poled in the conduction direction of the auxiliary valve to all those switching transistors of the inverter which are connected to the negative input terminal of the latter. Both arrangements can also be provided simultaneously side by side.

An advantage of this invention beyond the present state of the art is that a switching transistor equipped with this protective circuit can be utilized up to its thermal current limit and up to the full reverse voltage. Practical tests have shown that the switching transistor can be stressed more highly by a factor of 5 to 10 with respect to switching capacity than without protective circuit. This stated factor of 5 to 10 results from a current-carrying capacity higher by a factor of about 4 and a higher voltage stress by a factor of about 2. If used in inverters, moreover, very short commutation times are achieved. The protective circuit arrangement can therefore be considered as a commutation aid, which allows one to go to high inverter output frequencies. Thus, operation of transistorized inverters of high output frequency and high output becomes possible.

Examples of embodiments of this invention will be more fully explained with reference to the drawings.

DETAILED DESCRIPTION

Figure 1:
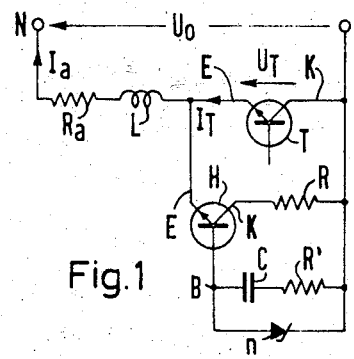
FIG. 1 is an electrical schematic diagram of a protective circuit arrangement for an PNP auxiliary transistor.

FIG. 1 shows an NPN switching transistor T, whose collector K is connected with a positive input terminal P and whose emitter E is connected with a negative input terminal N through a load which consists of an inductance L and an ohmic load resistor $Ra$. Instead of a single switching transistor T, several switching transistors can also be provided which are connected in series or in parallel. A DC supply voltage $U_o$ is connected between the input terminals P and N. The switching transistor T is fully turned on by a control signal at its base. Let us assume that the transistor current $I_T$ which is the maximum permissible for the transistor type in question flows through it as the load current $Ia$.

The collector-emitter path K-E of the switching transistor T is shunted by a protective circuit arrangement which acts like a voltage-dependent resistor. It consists of a series connection of a resistor R with a controlled auxiliary valve H and a control device for the auxiliary valve H. The resistor R must absorb the switching-off losses. It may be purely ohmic or may be voltage-dependent. Its value must be equal to or smaller than the value $R_a = U_o/I_{Tm}$. An NPN transistor is used as the auxiliary valve H in the embodiment shown in FIG. 1. The resistor R is connected between the collector of the auxiliary transistor serving as valve H and the positive input terminal P. If an NPN transistor is chosen as the auxiliary valve H, it is not possible to interchange the order of the auxiliary valve H and the resistor R shown in FIG. 1. The resistor of the series circuit being shunted across the collector-emitter path of the switching transistor is connected to the collector of the switching transistor and the emitter of the NPN auxiliary transistor of the series circuit being shunted across the collector-emitter path of the switching transistor is connected to the emitter of the switching transistor.

The auxiliary valve H poled in the conduction direction of the switching transistor T is controlled by an automatic control device, which is connected between the control electrode B of the auxiliary valve H, i.e., to the electrode B of the auxiliary transistor, and the collector K of the switching transistor. The control device is designed so that it supplies a current into the control electrode B of the auxiliary transistor H as a function of the voltage rise between the collector K and the emitter E of the switching transistor T. Therefore, as long as the switching transistor T carries a maximum load current $I_T$ or a small load current, the control device is not operative, and the auxiliary transistor H is cut off.

As shown in FIG. 1, the control device consists of a series circuit of a capacitor C and a charging resistor R'. In many cases the resistance of the leads of the capacitor C may already be sufficient. In the circuit shown in FIG. 1, if an NPN auxiliary transistor is used, the series circuit is arranged between the positive input terminal P and the control electrode B of the NPN auxiliary transistor H. This series circuit may also be shunted by a Zener diode N. The Zener voltage of said Zener diode N is chosen so that the auxiliary transistor H is fully turned on when the Zener voltage valve is applied to the control electrode of the auxiliary transistor H.

Figure 2:
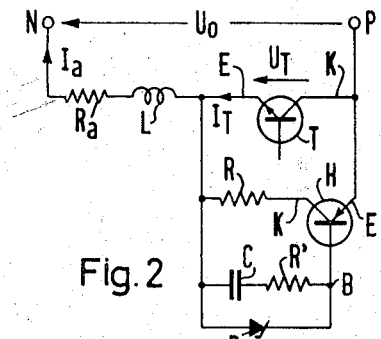
FIG. 2 is an electrical schematic diagram of a protective circuit arrangement for a pnp auxiliary transistor.

FIG. 2 shows the corresponding protective circuit arrangement, if a PNP transistor is used as the auxiliary valve H. Its emitter E is connected directly to the positive input terminal P and to the collector K of the switching transistor T. The resistor R is located between the emitter E of the NPN switching transistor T and the collector K of the PNP auxiliary transistor H. The series circuit of the capacitor C and the charging resistor R' is situated between the electrode B of the PNP auxiliary transistor H and the emitter E of the switching transistor T. Here too, a Zener diode n is provided.

Figure 3:
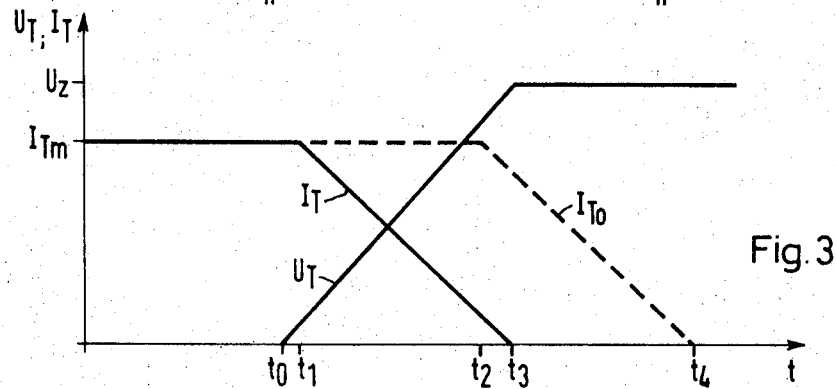
FIG. 3 is a graph of the voltage and current curves during the switching off of the switching transistor with time plotted along the horizontal axis and voltage and current plotted along the vertical axis.

FIG. 3 shows, in principle, the curves of the transistor voltage $U_T$ and the transistor current $I_T$ plotted against the time $t$ when the switching transistor T is switched off in a protective circuit such as shown in FIGS. 1 or 2.

Let us assume that up to the time $t_o$ the transistor current $I_{Tm}$ which, according to assumption, is the maximum permissible current for this type, flows through the switching transistor T. This current has the same magnitude as the load current $Ia$. The transistor voltage $U_T$ between the collector K and the emitter E of switching transistor T is practically zero. At the time $t_o$ the control signal at the base of the switching transistor T is now turned off. Without the protective circuit the transistor voltage $U_T$ would now jump to a voltage value $U_{To}$ (not shown), which is given by the relation $U = -L_a \, dI_T/dt$, where $L_a$ is the value of the inductance L and $dI_T/dt$ is the rate of change of the load and transistor current $I_T$. The transistor current $I_T$ would continue to flow for some time up to $t_4$ as indicated by the dashed line curve $I_{To}$ shown in FIG. 3. The switching transistor T would have to absorb at each point in time $t$ between $t_o$ and $t_4$ a power loss $P_{vo}(t)$ which is obtained by the product $P_{vo}(t) = U_{To}(t) \, I_{To}(t)$. The energy $U_o$ converted into heat in the switching transistor T between the time $._o$ and $t_4$ is calculated by integrating the power loss $P_{vo}(t)$.

If the protective circuit shown in FIGS. 1 or 2 is present, there is, after the switching transistor T is switched off at the time $t_o$, a rise of the transistor voltage $U_T$, which is large enough at the time $t_1$ to overcome the threshold voltage of the base-emitter path of the auxiliary transistor H. A displacement current flows from $t_1$ on through the charging resistor R' and the capacitor C into the control electrode B of the auxiliary transistor H. The latter is thereby turned on increasingly from the time $t_1$ on. Thus, an increasing share of the load current $I_a$ can flow through the resistor R and the auxiliary valve H. The transistor current $I_T$ consequently decreases more and more, as shown in FIG. 3, until it has reached the value $I_T = 0$ at the time $t_3$. With a suitable choice of the capacity of the capacitor C, a purely ohmic switching-off behavior for the transistor current $I_T$ and the transistor voltage $U_T$, shown in FIG. 3, can be obtained. A considerable portion of the magnetic energy stored in the inductance L prior to the switching-off is converted into heat in the resistor R during the time interval $(t_3 - t_1)$. The energy converted into heat in the switching transistor T is therefore considerably smaller than the stated value $E_o$.

For limiting the voltage at the switching transistor T, the Zener diode N is provided. It provides for the removal of all over-voltages occurring at the switching transistor T, so that they do not lead to the destruction of the switching transistor T. Its Zener voltage $U_z$ is chosen so that the auxiliary transistor H is fully turned on when the Zener voltage valve is applied to the control electrode, i.e., the base B of the auxiliary transistor through saturation of the Zener diode. If, after exceeding the supply voltage $U_o$, the transistor voltage $U_T$ reaches the Zener voltage $U_z$, the auxiliary transistor H is turned on to such an extent that across it and the resistor R just the sum voltage $U_z$ drops. During the switching-off process, the then still flowing load current $I_a$ commutates from the switching transistor T to the series circuit consisting of the resistor R and the auxiliary valve H and the current in the switching transistor T becomes zero. The Zener voltage $U_z$ remains at the switching transistor T only until the current in the auxiliary transistor H also has become zero. Subsequently the DC supply voltage $U_o$ appears across the collector-emitter path K-E of the switching transistor T.

With saturation of the Zener diode n and turning on of the auxiliary transistor H, the transistor voltage $U_T$ is equal to the Zener voltage $U_z$ and is kept constant and the auxiliary transistor H goes through the entire field of characteristics from the conduction voltage in saturated operation up to the maximum voltage. Correspondingly, the voltage drop across the resistor R decreases from the maximum voltage at full current.

It has been found also that in the event of occurring overvoltages, by far the largest part of the available energy is transferred to the resistor R and that the switching transistor T is not exposed to excessive stresses.

Figure 4:
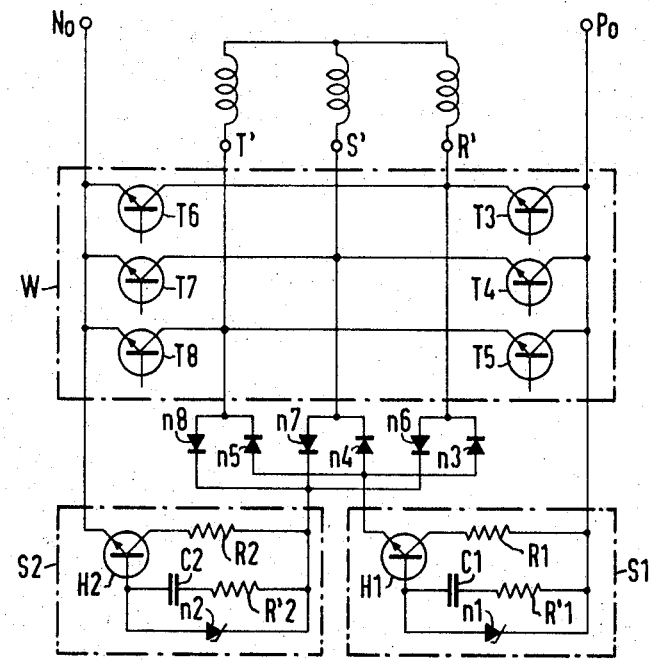
FIG. 4 is an electrical schematic diagram of an inverter with two protective circuits according to FIG. 1.

FIG. 4 shows an inverter W which is connected on the input side to a positive input terminal $P_o$ and a negative input terminal $N_o$ and on the output side to an inductive three-phase load with the phase inputs R', S', T'. The input terminals $P_o$ and $N_o$ may be fed, for example, by a battery or a rectifier with valves. The inductive load may be a rotating-field machine, which may also, for example, be connected to the output of the inverter W through a transformer. The inverter W consists of six switching transistors T3, T4, T5, T6, T7, and T8 in a three-phase bridge circuit. Each group of three switching transistors T3, T4, T5, and T6, T7, T8, is associated with a protective circuit arrangement S1 and S2, respectively, such as shown in FIG. 1.

The first protective circuit S1, consisting of the components H1, R1, C1, $r'1$ and $n1$, is provided for the group of three switching transistors T3, T4 and T5 which are each connected directly or through a choke (not shown) to the positive input terminal $P_o$. Correspondingly, the second protective circuit S2, consisting of the components H2, R2, C2, R'2 and $n2$, is provided for the group of three switching transistors T6, T7 and T8 which are connected to the negative input terminal $N_o$. Components H1 and H2 are auxiliary transistors. Components R1 and R2 are resistors. Components C1 and C2 are capacitors. Components R'1 and R'2 are resistors. Components $n1$ and $n2$ are diodes.

In order to avoid short circuits, diodes $n3$, $n4$, $n5$, $n6$, $n7$ and $n8$ are provided for each of the six switching transistors T3 to T8. The diodes $n3$ to $n8$ are each connected into a connecting line between the respective switching transistors T3 to T8 and the associated protective circuit arrangement S1 or S2. Each switching transistor T3, T4, T5 or T6, T7, T8 is therefore shunted by the series circuit of the associated resistor R1 or R2, respectively, with the connected control device and a diode, n3, n4, n5, and n6, n7, n8. The diodes n3 to n8 are poled in the conduction direction of the auxiliary transistors H1 and H2, respectively, and in the flow direction of the corresponding switching transistor T3 to T8. For instance, upon switching off the NPN switching transistor T3, there is a current-carrying connection from the positive input terminal $P_o$ through the resistor R1, the auxiliary transistor H1 and the diode n3 to the phase input R'. Upon switching off the switching transistor T3, this connection takes over a considerable part of the load current.

The protective circuits S1 and S2 of the inverter W, shown in FIG. 4, assure in all switching transistors T3 to T8 a switching-off curve of the transistor current and the voltage plotted against time which corresponds to that of a purely resistive load in the load circuit. The switching transistors T3 to T8 can, consequently, be stressed up to the thermal current limit and can, therefore, be utilized far better than customarily. Furthermore, the reverse voltage at the just disconnecting transistor T3 to T8 can rise very fast to its final value, which is given by the Zener voltage of the Zener diode n1 or n2, respectively. This means that the commutation process from one switching transistor to the next can take place considerably faster than with an inverter W without protective circuits S1 and S2. As a result, higher inverter output frequencies can be achieved. Finally, the protective circuits S1 and S2 assure that no excessive voltages occurring at the switching transistors T3 to T8 during switching off.

In the foregoing specification, the invention has been described in reference to specific exemplary embodiments. It will be evident, however, that variations and modifications in the embodiments explained by way of illustration may be made without departing from the broader scope and spirit of the invention as set forth in the appended claims. The specification and drawings are accordingly to be regarded in an illustrative rather than in a restrictive sense.

What is claimed is:

1. A protective circuit arrangement for a switching transistor, said switching transistor being arranged in an inductive load circuit for switching the load current on and off, said protective circuit arrangement comprising:
   a. a series circuit comprising a resistor and a controlled auxiliary valve, said series circuit being shunted across the collector-emitter path of said switching transistor; and
   b. a control device for controlling the control electrode of said auxiliary valve as a function of the voltage rise at said switching transistor.

2. The protective circuit arrangement according to claim 1 wherein said controlled auxiliary valve is a transistor.

3. The protective circuit arrangement according to claim 2 wherein said control device comprises a series circuit of a capacitor and a charging resistor, said control device being connected between the control electrode of said auxiliary valve and the collector of said switching transistor.

4. The protective circuit arrangement according to claim 3 and further comprising a Zener diode, said Zener diode being shunted across said series circuit comprising said capacitor and said charging resistor, the Zener voltage of said Zener diode being chosen so that said auxiliary transistor is fully turned on when the Zener voltage value is applied to the control electrode of said auxiliary transistor.

5. The protective circuit arrangement according to claim 1 wherein said controlled auxiliary valve is an NPN transistor.

6. The protective circuit arrangement according to claim 5 wherein said resistor of said series circuit being shunted across the collector-emitter path of said switching transistor is connected to the collector of said switching transistor; and the emitter of said npn auxiliary transistor of said series circuit being shunted across the collector-emitter path of the switching transistor is connected to the emitter of the switching transistor.

7. The protective circuit arrangement according to claim 1 wherein said auxiliary valve is a PNP transistor.

8. The protective circuit arrangement according to claim 7 wherein said resistor of said series circuit being shunted across the collector-emitter path of said switching transistor is connected to the emitter of said switching transistor; and the emitter of said PNP auxiliary transistor is connected to the collector of said switching transistor.

9. A protective circuit arrangement adapted for use with an inverter having a plurality of switching transistors, said inverter being connected on the output side to an inductive load and on the input side to a positive input terminal and to a negative input terminal, said protective circuit arrangement comprising:
   a. a plurality of series circuits each comprising a resistor and a controlled auxiliary valve, each said series circuit being shunted across the collector-emitter path of one or more of said switching transistors; and
   b. a plurality of control devices for controlling the control electrode of each said auxiliary valve as a function of the voltage rise at the respective switching transistor.

10. The protective circuit arrangement according to claim 9 wherein said plurality of switching transistors comprises six switching transistors arranged in two groups, each group comprising three switching transistors, and said protective circuit arrangement comprises:
    a. two said series circuits, each circuit comprising a resistor and a controlled auxiliary valve, one said series circuit being associated with each said group of three switching transistors; and
    b. two said control devices, one said control device for each of said series circuits.

11. The protective circuit arrangement according to claim 10 wherein said controlled auxiliary valves are transistors.

12. The protective circuit arrangement according to claim 10 wherein said control devices each comprise a series circuit of a capacitor and a charging resistor, each said control device being connected between the control electrode of said auxiliary valve of one of said series circuits and the collectors of one group of said three switching transistors.

13. The protective circuit arrangement according to claim 10 and further comprising six diodes, one diode for each of the six switching transistors, each diode being connected between its respective switching transistor and the associated series circuit of said protective circuit arrangement, and each diode being poled in the direction of said auxiliary valve of said associated series circuit.

14. The protective circuit according to claim 10 wherein one said group of three switching transistors is connected to the positive input terminal of said inverter and the other said group of three switching transistors is connected to the negative input terminal of said inverter.

* * * * *

UNITED STATES PATENT OFFICE
CERTIFICATE OF CORRECTION

Patent No. 3,729,655          Dated  April 24, 1973

Inventor(s) Werner Gratzke

It is certified that error appears in the above-identified patent and that said Letters Patent are hereby corrected as shown below:

Column 4, lines 63 and 64, change "diode N" to read --diode n--;

Column 5, line 39, change "time $_o$" to read --time $t_o$--;

Column 5, line 65, change "diode N" to read --diode n--.

Signed and sealed this 18th day of December 1973.

(SEAL)
Attest:

EDWARD M.FLETCHER,JR.          RENE D. TEGTMEYER
Attesting Officer              Acting Commissioner of Patents